(12) United States Patent
Stein

(10) Patent No.: US 7,890,055 B1
(45) Date of Patent: Feb. 15, 2011

(54) TOUCH FIELD COMPOUND FIELD DETECTOR PERSONAL ID

(75) Inventor: John William Stein, Allentown, PA (US)

(73) Assignee: Everlokt Corporation, Allentown, PA (US)

( * ) Notice: Subject to any disclaimer, the term of this patent is extended or adjusted under 35 U.S.C. 154(b) by 460 days.

(21) Appl. No.: 12/217,776

(22) Filed: Jul. 9, 2008

Related U.S. Application Data

(60) Provisional application No. 60/958,982, filed on Jul. 9, 2007.

(51) Int. Cl.
*H04B 5/00* (2006.01)

(52) U.S. Cl. ............... 455/41.1; 455/85; 455/214; 455/264; 455/263; 340/373.1; 607/32

(58) Field of Classification Search ......... 455/41.1, 455/85, 214, 264, 263, 100, 414.1; 235/380; 607/32, 60; 340/573.1
See application file for complete search history.

(56) References Cited

U.S. PATENT DOCUMENTS

| | | | | |
|---|---|---|---|---|
| 3,638,640 | A * | 2/1972 | Shaw ........................ | 600/323 |
| 3,873,050 | A * | 3/1975 | Hill ............................ | 244/177 |
| 4,708,930 | A * | 11/1987 | Kortright et al. ........... | 435/7.23 |
| 6,310,371 | B1 * | 10/2001 | Hung ......................... | 257/252 |
| 7,432,725 | B2 * | 10/2008 | Sieh et al. .................. | 324/662 |
| 7,615,213 | B2 * | 11/2009 | Kasaian et al. ............ | 424/133.1 |
| 7,642,515 | B2 * | 1/2010 | Tinnes ........................ | 250/352 |
| 7,668,596 | B2 * | 2/2010 | Von Arx et al. ............. | 607/32 |
| 2002/0039028 | A1 * | 4/2002 | Douglas et al. ............ | 324/658 |
| 2003/0098683 | A1 * | 5/2003 | Lapinksi et al. ........... | 324/117 R |
| 2006/0025834 | A1 * | 2/2006 | Von Arx et al. ............. | 607/60 |
| 2007/0216424 | A1 * | 9/2007 | Sieh et al. .................. | 324/662 |
| 2008/0255430 | A1 * | 10/2008 | Alexandersson et al. .... | 600/300 |
| 2008/0273768 | A1 * | 11/2008 | Dennis et al. .............. | 382/124 |
| 2009/0065699 | A1 * | 3/2009 | Vaquero et al. ........... | 250/363.03 |
| 2009/0096413 | A1 * | 4/2009 | Partovi et al. .............. | 320/108 |
| 2009/0140149 | A1 * | 6/2009 | Tinnes ........................ | 250/352 |
| 2010/0026509 | A1 * | 2/2010 | Boehm et al. ............. | 340/686.6 |
| 2010/0097609 | A1 * | 4/2010 | Jaeger et al. ............... | 356/402 |
| 2010/0109866 | A1 * | 5/2010 | Gavrila et al. .............. | 340/540 |
| 2010/0193410 | A1 * | 8/2010 | Boll ........................... | 209/418 |
| 2010/0228166 | A1 * | 9/2010 | Centen ....................... | 601/41 |
| 2010/0244027 | A1 * | 9/2010 | Numata ...................... | 257/48 |

OTHER PUBLICATIONS

JIJI Press, NTT to Commercialize Novel Human Body Communication System. http://www.japancorp.net/printarticle.asp?art_ID=16990.

* cited by examiner

*Primary Examiner*—Minh D Dao

(57) ABSTRACT

A near field detection device that detects a field near the body when appropriately connected to conductive plates. The near field is generated by an oscillatory voltage device which when in contact with the body permeates all that is in contact with the body. The detector electronics and conductive plates are packaged so that near contact with the body is accommodated. A footwear packaging scheme provides a convenient location to embed the detector invention, though other packaging arrangements and locations on the body are claimed. Auxiliary electronics may be included with the detector and conductive plates to provide additional synergistic functionality to the packaging scheme.

1 Claim, 4 Drawing Sheets

Low Output Impedance Gated Voltage Oscillator

TOUCH FIELD COMPOUND FIELD DETECTOR PERSONAL ID

This claims the benefit of a prior filed provisional application No. 60/958,982 filed on Jul. 9, 2007.

FIELD OF INVENTION

This application relates generally to field detection devices and specifically to field detection arrangements and devices sensitive to the body whereby the body is used as a field emitter.

BACKGROUND

The entire human body emits a close range surface field if it is brought in direct contact with a voltage oscillator (FIG. 2). This close range surface field can be most reliably detected if direct skin contact is made with the output of this voltage oscillator and certain inventive practices are followed as described below.

Historically radio frequency (rf) receivers are sensitive to the magnetic component in the electromagnetic signal (rf) typically generated by a rf transmitter. The magnetic component in an electromagnetic signal has the ability to travel over infinite distances and is optimal for distant communications. The electro component found in an electromagnetic signal is peripheral to the signal conduction medium and can and is used for short range detection using typical field detector circuits. Where the magnetic component in an electromagnetic signal is peripherally unpredictable the electro component in an electromagnetic signal is, within limits, generally peripherally predictable.

The typical field detector uses a point source field sensitive antenna and acts like a short range radio receiver and is activated when in the presence of an electrical field. Using a point source antenna for field generation results in a spherical field radiating outward for a limited distance. Since electrical fields are confined to short distances from and around a field emitter antenna, field detectors are good for sensing and activating generally near range remote events.

BRIEF DESCRIPTION OF THE DRAWINGS

The invention will now be described by way of example with reference to the accompanying figures of which:

FIG. 2 is a general schematic of the electronics that would produce a field that the detection electronics in FIG. 1 would be sensitive to.

DETAILED DESCRIPTION OF THE EMBODIMENT

Figure 2:
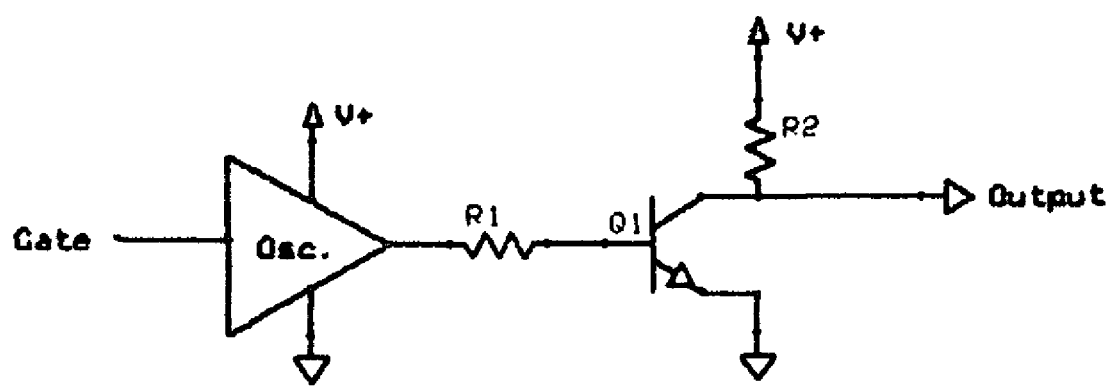

The field detector invention herein relies on a compound field emitter scheme that first uses a typical low impedance field emitter (FIG. 2) to secondarily transfer field energy to a high impedance emitter, animal flesh. The result of this inventive scheme is the generation of a non point source emitter (animal flesh) that evenly radiates an extremely short range field secondarily from the skin's surface to a unique compound field detector to achieve practical reliable control of remote systems.

Figure 1:
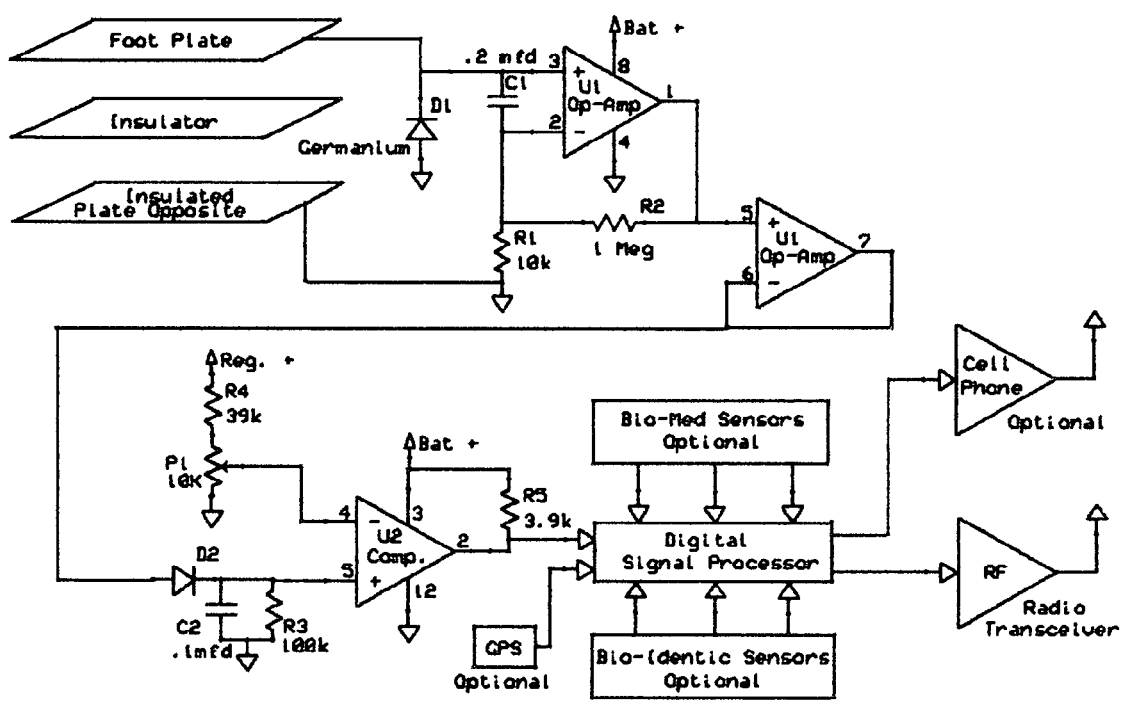
FIG. 1 is a general schematic of the detection electronics that would cause the invention to perform as per the claims.

This unique compound field detector (see FIG. 1) consists of a amplifier connected differentially to two opposing conductive plates insulated one from the other with one plate facing away from the body and the opposing plate facing toward and in close near contact with the human body. This amplifier detects the field signal differences between the plates caused by an oscillating voltage coming in direct contact with the body. This amplifier coupled with additional proprietary electronics integrates and filters the field signal to produce a reliable digital signal when the body comes in direct contact with an oscillatory voltage. This digital signal is analyzed by a digital signal processor which in turn sends a secure encrypted signal to a transceiver that in turn makes possible remote systems control.

A compound field detector arrangement is claimed that combines a oscillating voltage source (FIG. 2) directly accessible by animal flesh in vary close proximity to a field detection and transmission system (FIG. 1) to reliably allow remote control of external electronic systems. This compound field detector arrangement constitutes the primary thrust though not the only claims of this invention application.

Figure 3:
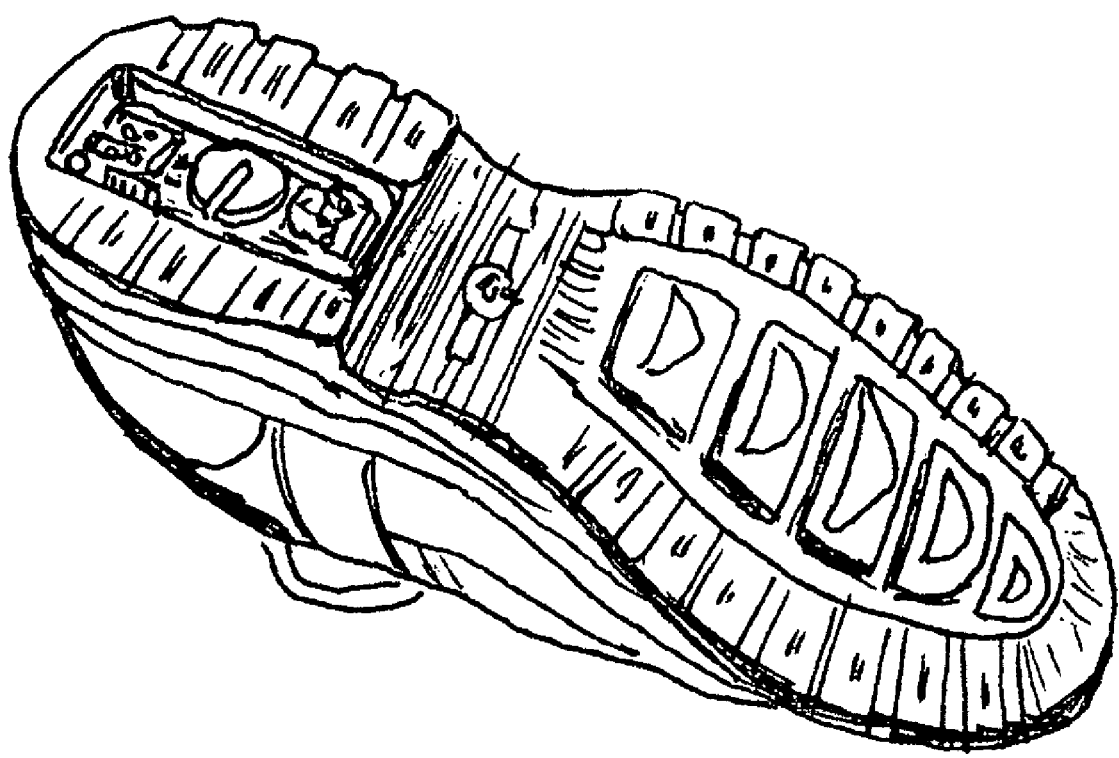
FIG. 3 shows a packaging arrangement where the detection electronics shown in FIG. 1 would be embedded directly into footwear.
Figure 4:
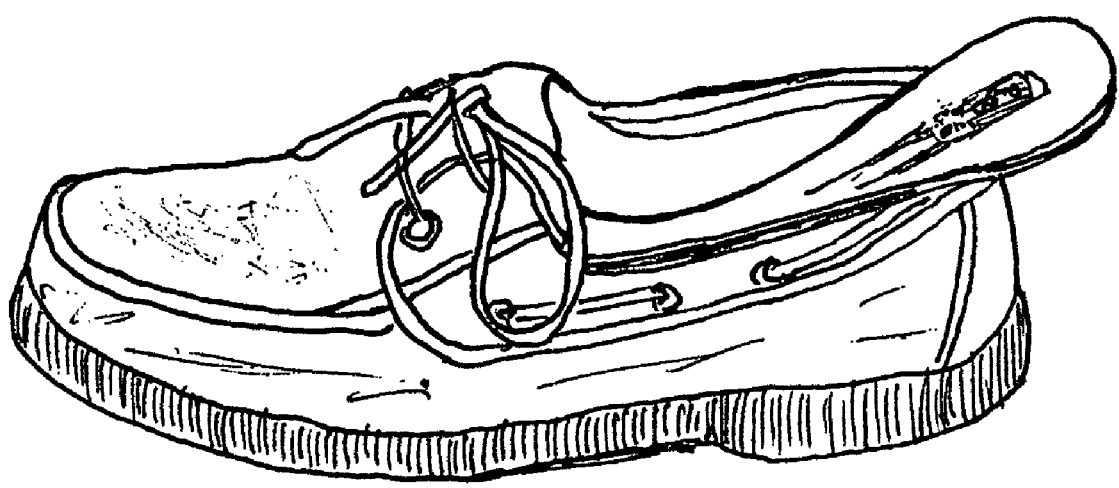
FIG. 4 depicts a packaging arrangement where the detection electronics shown in FIG. 1 would be embedded inside removable footpads.

To accommodate the above described compound field detector arrangement a location reliably near the body is required. Inserting the opposing plates mentioned earlier inside footwear, hereafter referred to as Footware™, assures this close consistent bodily contact needed by the compound field detector arrangement. Direct skin contact with the foot plate is permissible, though not necessary for reliable operation. The plate opposite the foot plate must be electrically insulated from the foot plate to eliminate attenuation of the field signal from foot moisture. Application of the podiatry or Footware™ invention arrangement is generally envisioned in two ways. The compound field detector and plates can be integrated into footwear during manufacture (see FIG. 3) or the compound field detector and plates can be integrated into footpads (see FIG. 4) for customer insertion into existing footwear.

Other close skin contact arrangements such as bracelets, watches, belts, skin patches etc. can incorporate the compound field detector electronics to provide the same benefits afforded by the close near skin contact with the body accomplished in the preferred compound field detector arrangement describe earlier in this patent application.

For enhanced security and safety, the novel personal I.D. scheme can be optionally combined with pressure, heat and motion sensors etc., whereby electrical signals from these sensors can be additionally connected to and analyzed by the Footware™ digital signal processor. Digital signature analysis by the digital signal processor of individual walking patterns detected by the embedded sensors would allow reliable individual identification of the wearer of the Footware™ System based on forces of motion and movement and will be referred to as BioIdentic™ Analysis. BioIdentic™ Analysis combined with the Footware™ System provides a powerful inventive combination for secure control of external events. Once the wearer of this new technology can be individually identified, many additional applications can be realized. BioIdentic™ Analysis could be combined with Biometric data, if available, to further enhance the identity reliability of a person wearing an enhanced Footware™ System.

Optional Biometric Sensors (FIG. 1) embedded in the Footware™ System can be analyzed by the digital signal processor to warn the wearer of developing health issues. With the addition of optional GPS and optional cell phone transmission electronics (FIG. 1), the Footware™ System can report the location of personal emergency health events and additionally be programmed to detect unusual foot movement and/or location and automatically report abductions and criminal aggressions. This later aspect of Footware™ System technology would be particularly relevant to child abduction prevention and recovery.

The voltage oscillator (FIG. 2) can be gated or modulated to allow digital information to be communicated to the digital signal processor for programming and control of the Footware™ System. Traditional radio communication techniques can also be used to program the Footware™ System.

The herein invention would be programmed by sending a personal coded signal, either field or radio based as described above, alerting the optionally enhanced Footware™ System that programming is to take place.

Once in programming mode, one would take several average steps to allow the Enhanced Footware™ System (FIG. 1) to learn and store a personal step profile. Thereafter the step profile is checked each time one puts on their shoes and takes several steps. If the programmed step profile matches the wearer step profile the identification permission program is reactivated and remote access and control is allowed. The identification permission program is deactivated each time the shoe is removed.

A novel and inventive power generation scheme for this invention involves the use of power generating components embedded in the Footware™ System that generates power when flexed during walking. An example is the use of piezoelectric (ceramic or plastic) components embedded in the shoe or footpad which has the ability when flexed to generate and store power in a battery with each step. This novel scheme eliminates the need to periodically replace batteries when they are exhausted. Other power generating schemes could be applied that translates foot flexing energy into electricity for use by the footware invention. Inductive battery recharging schemes along with traditional replaceable battery operation are also powering options.

BioIdentic™ Analysis, Biometrics, GPS and cell phone communications options embedded in the Footware™ System results in an vary flexible and Enhanced Footware™ System.

The Enhanced Footware™ System and other compound field detector arrangement packaging embodiments provides security sensitive applications with new access and control options. Point of sale transactions, equipment operation control, home and business access control, automobile entry and operation, secure aircraft access, computer individualized data entry and high security risk facilities management etc. are prime applications candidates for this invention.

For example: Automated Point of Sales are presently and generally done with credit or debit cards. An Enhanced Footware™ System wearer would only require touching a terminal to record and display transaction information and if correct finalize the transaction with a second touch of the terminal.

I claim:
1. A touch field compound field detector comprising:
two opposing metal plates separated by an insulation material;
differential amplifier inputs electrically connected to the two metal plates;
an output of the differential amplifier being electrically connected to a voltage level sense device;
the level sense device configured to produce a digital process signal when a body comes in electrical contact with an oscillatory signal causing the body to become a near field emitter to the detector.

* * * * *